United States Patent Office 3,189,476
Patented June 15, 1965

3,189,476
METALLIZING PROCESS FOR CERAMICS
Robert E. Cowan, Los Alamos, N. Mex., assignor to the United States of America as represented by the United States Atomic Energy Commission
No Drawing. Filed Sept. 18, 1962, Ser. No. 224,578
8 Claims. (Cl. 117—22)

The present invention is concerned with a metallizing process for ceramics and more particularly with a process which provides a strongly adherent molybdenum or tungsten metallic surface coating on an alumina ceramic ware.

This process is useful in the preparation of hermetic ceramic-to-metal seals where high strengths are required. Such seals are used in plasma thermocouple insulators, discharge tubes and feed-through insulators for electrical devices.

The present invention provides a novel process for the formation of a molybdenum or tungsten-aluminum oxide reaction layer. Most commonly used processes involve the use of molybdenum and manganese metals in which the said manganese reacts with water vapor when heated in a wet hydrogen atmosphere to form manganese oxide. The manganese oxide then reacts with the alumina ceramic to form a compound which melts to form the reaction layer and to provide the necessary adherence. Minor amounts of iron, calcia, silica and titanium hydride may be added to promote the liquid phase formation. Our process involves the forming of a liquid phase on the surface of the alumina which reacts chemically with said surface and upon cooling yields an adherent metallic layer. A metallic phase is added to the liquid in order that the resulting surface layer may be brazed to other metals by well known techniques. Specifically, a powdered mixture of calcium oxide, aluminum oxide and molybdenum oxide is applied in a thin layer to the surface of an alumina ceramic piece. The coated piece is heated to about 1600° C. in a reducing atmosphere. During this heat treatment the molybdenum oxide is reduced to molybdenum metal and the calcium oxide and aluminum oxide in the coating react with the alumina of the ceramic to form a strongly bonded layer. The resultant ceramic ware has a coating containing molybdenum metal which is mechanically bonded to the reaction layer which in turn is chemically bonded to the said ceramic ware.

It is therefore an object of this invention to provide a process for the formation of a molybdenum or tungsten metal coating on an alumina ceramic ware surface, said coating being electrically conductive and brazable to other metals.

Another object of this invention is to provide a process for the formation of a metallic coating of molybdenum or tungsten metal which is mechanically bonded to a calcium oxide-aluminum oxide reaction layer which in turn is bonded chemically to the alumina ceramic ware.

Other objects of this invention will be apparent from the following description of a specific embodiment of the present invention.

A powdered mixture composed of calcium oxide, aluminum oxide and molybdenum oxide with the said calcium oxide and aluminum oxide being present in a one to one molar ratio is prepared so that upon heating the compound $CaAl_2O_4$ is formed. Various amounts of molybdenum oxide may be used but a preferred molar composition is 10 molar parts molybdenum oxide to one molar part each of calcium oxide and aluminum oxide respectively. The calcium oxide and aluminum oxide may be prereacted and added as $CaAl_2O_4$. The finely divided powdered mixture is applied to the surface of an alumina ceramic from a slurry by brushing, spraying, screening or other methods well known in the art. The coating should be approximately 0.001 inch thick for optimum results. The coated ceramic is then heated in an atmosphere which is reducing to molybdenum oxide but not calcium oxide or aluminum oxide. Hydrogen having a dew point greater than −60° C. is a satisfactory atmosphere. At about 600° C. the molybdenum oxide will be reduced to a molybdenum metal and about 1200° C. the calcium oxide and aluminum oxide will react to form $CaAl_2O_4$. At approximately 1600° C. the $CaAl_2O_4$ will melt and begin to dissolve aluminum oxide from the ceramic base piece. A temperature of 1650° C. is the maximum that is needed in this process to form a chemical bond between the ceramic piece and the $CaAl_2O_4$ layer. As the molten $CaAl_2O_4$ dissolves the alumina the composition of the reaction layer will approach that of $CaAl_4O_7$. When this composition is finally reached solidification will occur since the melting point of $CaAl_4O_7$ is about 1700° C. Approximately 30 minutes at 1650° C. is adequate for this composition to form. The temperature of the ceramic piece is then lowered to room temperature and it will be found that the alumina ceramic is coated with a calcium oxide-aluminum oxide compound which contains metallic molybdenum. If the composition stated above is used, the coating will contain approximately 68 volume percent or 90 percent by weight of molybdenum. This coating is electrically conductive and is strongly bonded to the base ceramic.

In another embodiment of this invention, a one to two molar ratio of calcium oxide to aluminum oxide with the same amount of molybdenum as the aforementioned embodiment is used to obtain equally good results. In this case the compound $CaAl_4O_7$ is formed and has a melting point of approximately 1700° C. Thus, in this embodiment a maximum temperature of at least 1700° C. must be used. In all other respects this embodiment is the same as the aforementioned embodiment.

Another embodiment of the present invention is a reaction layer that is composed of 30 volume percent or 7.5 percent by weight of $CaAl_2O_4$ and 70 volume percent or 92.5 percent by weight of tungsten, the tungsten being added as tungsten oxide. The said layer can be joined to niobium metal using palladium as a brazing alloy to form a hermetic seal. Like the molybdenum oxide, the tungsten oxide is reduced to tungsten metal during the firing as described in the first embodiment and at the same temperature. The trioxide of molybdenum is used in the composition for several reasons. It has a low density and therefore is retained in a liquid suspension more readily than the more dense molybdenum metal. This is important since it is common practice to apply the coating by painting, dipping, or spraying from a liquid suspension. The trioxide is a soft material and may be easily ground to a fine particle size thereby producing a uniform dispersion of metal throughout the liquid phase. However, other compounds of tungsten can be used for the metallizing layer provided they are reduced to the metallic state during the firing operation.

A property of all the aforementioned embodiments is the high temperature which the hermetic seals that are made from this process can be used. These seals have withstood temperatures in the range of 1200°–1400° C. for extended periods without breaking down while ceramic metal seals heretofore were mostly limited to a maximum service temperature of 700° C.

The optimum composition of the metallic reaction layer is 90 percent by weight of molybdenum or tungsten metal and 10 percent by weight of oxides, said oxides being composed of calcium oxide and aluminum oxide. The amount of molybdenum or tungsten metal is critical, for below 84 percent by weight of the coating will not be electrically conductive. Correspondingly, if the molybdenum or tungsten content in the reaction layer is greater than 80 volume percent the bond strength of the coating is greatly reduced or weakened. Thus, a reaction layer composition ranging between 84 and 95 percent by weight of the desired metal and the balance CaO and $Al_2O_3$ is the critical limits of composition in this process.

It will be apparent to those skilled in the art that various modifications can be made without departing from the principles of the invention as disclosed herein, and for this reason it is not intended that the invention shall be limited other than by the scope of the appended claims.

What is claimed is:

1. A process for forming a metallic coating on an alumina ceramic surface, said coating containing between 84 and 95 percent by weight of the metal, said metal being selected from the class consisting of molybdenum and tungsten, comprising the applying of a powdered calcium oxide-aluminum oxide and a metallic oxide of at least one of the said metals in an approximate molar ratio of 1:1:10 respectively in a thin coating to the said ceramic surface and heating the said ceramic and its coating in an atmosphere which is reducing only to said metallic oxide to a temperature of approximately 1650° C. for about 30 minutes.

2. The process of claim 1 in which the said metal in the fired metallic coating on the alumina surface is tungsten.

3. The process of claim 1 in which the said atmosphere is hydrogen, said hydrogen having a dew point greater than −60° C.

4. The process of claim 1 in which said metallic oxides are the trioxides of molybdenum and tungsten.

5. The process of claim 1 in which said metallic coating after the firing operation contains 90 percent by weight of molybdenum metal, the balance being equal amounts of calcium oxide and aluminum oxide.

6. The process of claim 1 in which the said metallic coating contains 92.5 percent by weight of molybdenum metal, the balance being equal amounts of calcium oxide and aluminum oxide.

7. The process of claim 1 in which said metal in the fired metallic coating on the alumina ceramic surface is molybdenum.

8. The process of claim 7 in which the said molar ratio of the calcium oxide, aluminum oxide, and metallic oxide is 1:2:10 respectively, and the firing temperature is about 1700° C.

References Cited by the Examiner

UNITED STATES PATENTS

| | | | |
|---|---|---|---|
| 2,928,755 | 3/60 | Brandstadt et al. | 117—160 |
| 3,016,311 | 1/62 | Stackhouse | 117—160 |
| 3,039,892 | 6/62 | Nolte | 117—118 |
| 3,051,592 | 8/62 | Woerner | 117—160 |

OTHER REFERENCES

German application G 12,202, Mesick, May 9, 1956.

RICHARD D. NEVIUS, *Primary Examiner.*